United States Patent [19]
Pierce

[11] Patent Number: 5,933,963
[45] Date of Patent: Aug. 10, 1999

[54] TUBE SAW

[75] Inventor: Kenneth R. Pierce, Barrington, Ill.

[73] Assignee: The E. H. Wachs Company, Wheeling, Ill.

[21] Appl. No.: 08/893,947

[22] Filed: Jul. 16, 1997

[51] Int. Cl.[6] .............................. B26D 3/16; B23D 21/06
[52] U.S. Cl. .................................. 30/97; 30/101; 82/59; 82/70.2
[58] Field of Search ................................. 30/93, 94, 95, 30/96, 97, 101, 102; 82/59, 70.1, 70.2, 78, 79, 83; 83/522.15

[56] References Cited

U.S. PATENT DOCUMENTS

| | | | |
|---|---|---|---|
| 3,088,352 | 5/1963 | Tanner | 30/97 X |
| 3,279,059 | 10/1966 | Keiter | 30/96 |
| 3,974,562 | 8/1976 | Wuchner | 30/97 |
| 4,608,755 | 9/1986 | Braasch | 30/97 |
| 4,776,248 | 10/1988 | Birkestrand | 30/94 X |
| 5,189,933 | 3/1993 | Ricci | 30/97 X |
| 5,349,751 | 9/1994 | Fahr | 30/102 |

FOREIGN PATENT DOCUMENTS

| | | | |
|---|---|---|---|
| 0106717 | 8/1980 | Japan | 30/97 |

OTHER PUBLICATIONS

George Fischer Pipe Cutting and Bevelling Machines, 1988.

*Primary Examiner*—Eugenia A. Jones
*Attorney, Agent, or Firm*—Robert L. Marsh

[57] ABSTRACT

A tube saw has a housing body with a first side, a second side, and a central opening. Surfaces of the first and second sides are machined parallel to each other. A cutter with a rotating blade is mounted on the first side and a vice is mounted on the second side to thereby maintain a work piece held in the vise perpendicular to the cutter. An indicator pin and viewing hole facilitate aligning a work piece within the saw so that the blade will cut the work piece where desired.

15 Claims, 10 Drawing Sheets

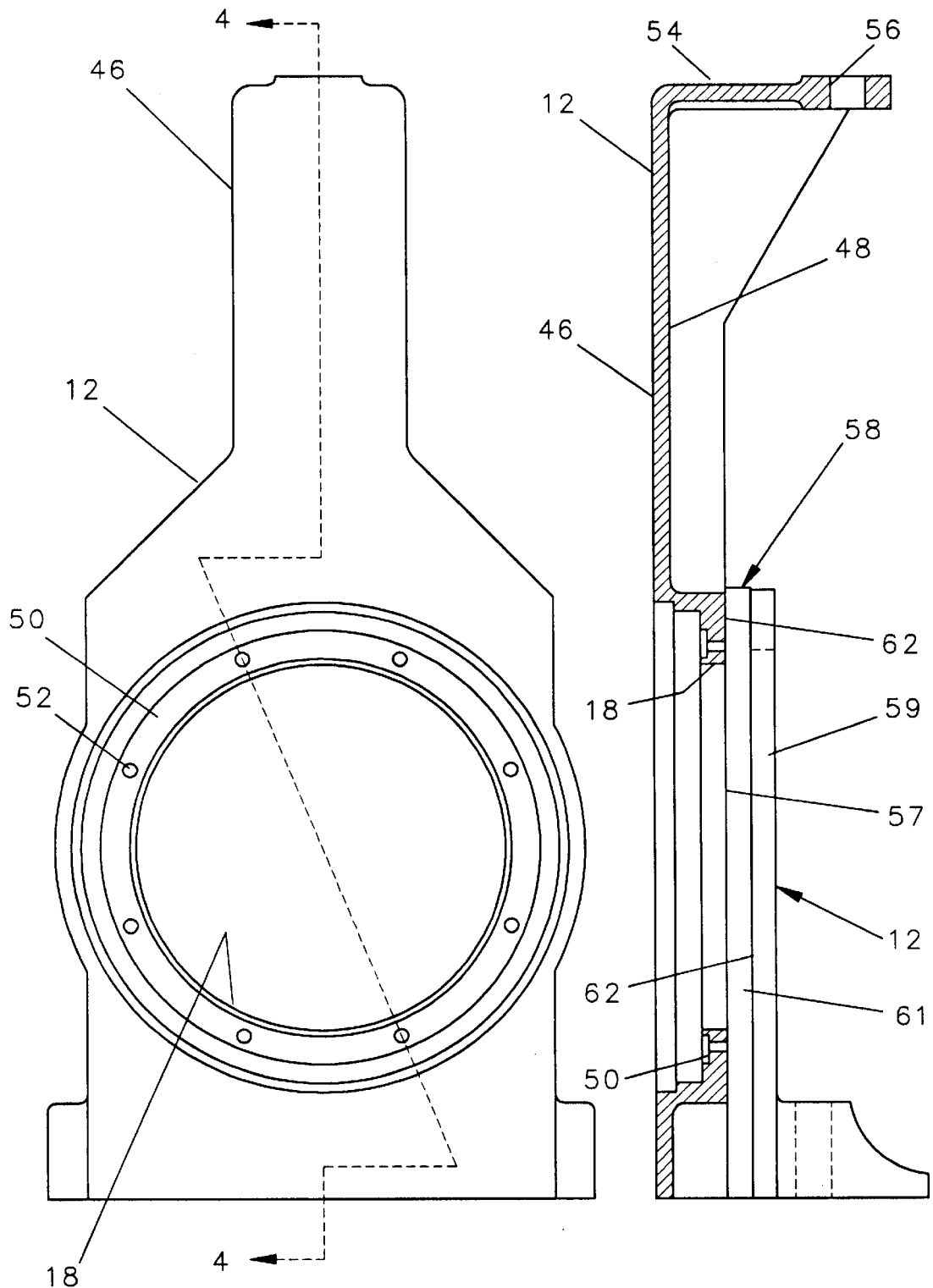

TUBE SAW

The present invention relates to machines for sawing tubing, and in particular, to machines for sawing a square end to a length of tubing.

BACKGROUND OF THE INVENTION

The assembly of tubing requires that lengths of tubes be cut to predetermined lengths, with the ends thereof cut square such that the ends of the tubing may be welded to adjacent lengths of tubing. Where tubing is not cut square or is not cut to the correct length, there will be spaces when the tubing is assembled. The spaces at the end of the tubing require additional welding time to produce a weld. Where the specifications require a higher quality of weld, it may be necessary to discard a poorly cut length of pipe having an end which is not square or is cut too short.

Machines are available for cutting a square end to a length of pipe. The typical cutting machine includes a housing with a central opening and at the forward end of the housing a pivot member which retains a cutting tool and is rotatable around the central opening. At the rearward end of the housing is a vise to retain a workpiece with the axis thereof perpendicular to the plane of cut of the cutting tool.

Existing tube saws include a vise structure which is retained by bolts and the like to the housing for retaining the rotating cutting member. Such machines are large and bulky and are expensive to manufacture because they have a plurality of parts which must be assembled in side-by-side relationship, with each of the parts having several machined surfaces to form parallel planar forward and rear surfaces such that the assembled vise will retain a workpiece perpendicular to the cut of the cutting tool. The machining of parallel surfaces dramatically increases the cost of manufacture of such machines.

Existing machines rely upon the ability of the operator to accurately position a workpiece with respect to the saw blade to cut a workpiece to the desired length. However, it is difficult to visually inspect the cutting tool of such machines to see where it will cut a work piece. This is because the cutting blade must be positioned near the vise and away from the front of the machine to minimize the bending of the pipe during the cutting operation.

It would be desirable to provide a machine that is less expensive to manufacture because it does not require the assembly of a multiplicity of parts having precision machined surfaces. It would also be desirable to provide a machine having a vise which is positioned near the rotatable saw blade such that the pipe can be sawed with a minimum of bending and yet be visible to an operator. Furthermore, it would be desirable to provide a machine for which an operator can readily align the blade of the machine with a cut line on a workpiece.

SUMMARY OF THE INVENTION

Briefly, the present invention is embodied in a tube saw having a housing body, the body having a first side and a second side and a central opening extending through the first and second sides. The housing further has a first surface on the first side which is parallel to a second surface on the second side.

A cutter element mounted on the first surface on the housing retains a rotatable saw blade. The second surface of the housing defines a pair of parallel tracks into which one of the movable jaws of a vice is slidable. Since the first surface and second surface are parallel to each other, the rotatable saw blade rotates in a plane perpendicular to the axis of a workpiece retained in the vise.

In accordance with another feature of the invention, a cam is positioned on the housing and a follower positioned on the cutter element such that engagement of the cam by the follower of the cutter element will move the saw blade radially inward relative to the longitudinal axis of a workpiece retained in the vise as the cutter element is rotated on the first surface.

The invention further includes an adjustment for radially adjusting the saw blade whereby the tube saw can saw tubes of a plurality of diameters.

An indicator pin is provided on the housing or the pivot member which is movable in the plane defined by the cut of the saw toward and away from a surface of a workpiece retained in the vise. Accordingly, a workpiece having a mark thereon to indicate the desired cut length can be positioned in the vise and the line positioned underneath the indicator pin to cut the workpiece to the desired length. In the preferred embodiment, the machine further provides a window through which the operator can readily see the surface of a workpiece extending through the vise and the distal end of the indicator pin to thereby facilitate the aligning of a mark on the workpiece under the indicator pin.

BRIEF DESCRIPTION OF THE DRAWINGS

A better and more complete understanding of the present invention will be had after a reading of the following detailed description taken in conjunction with the drawings wherein:

FIG. 3 is an enlarged front elevational view of the housing for the tube saw of FIG. 1;

FIG. 4 is a side cross-sectional view of the housing shown in FIG. 3 taken through line 4—4 thereof;

DETAILED DESCRIPTION OF THE PREFERRED EMBODIMENT

Figure 1:
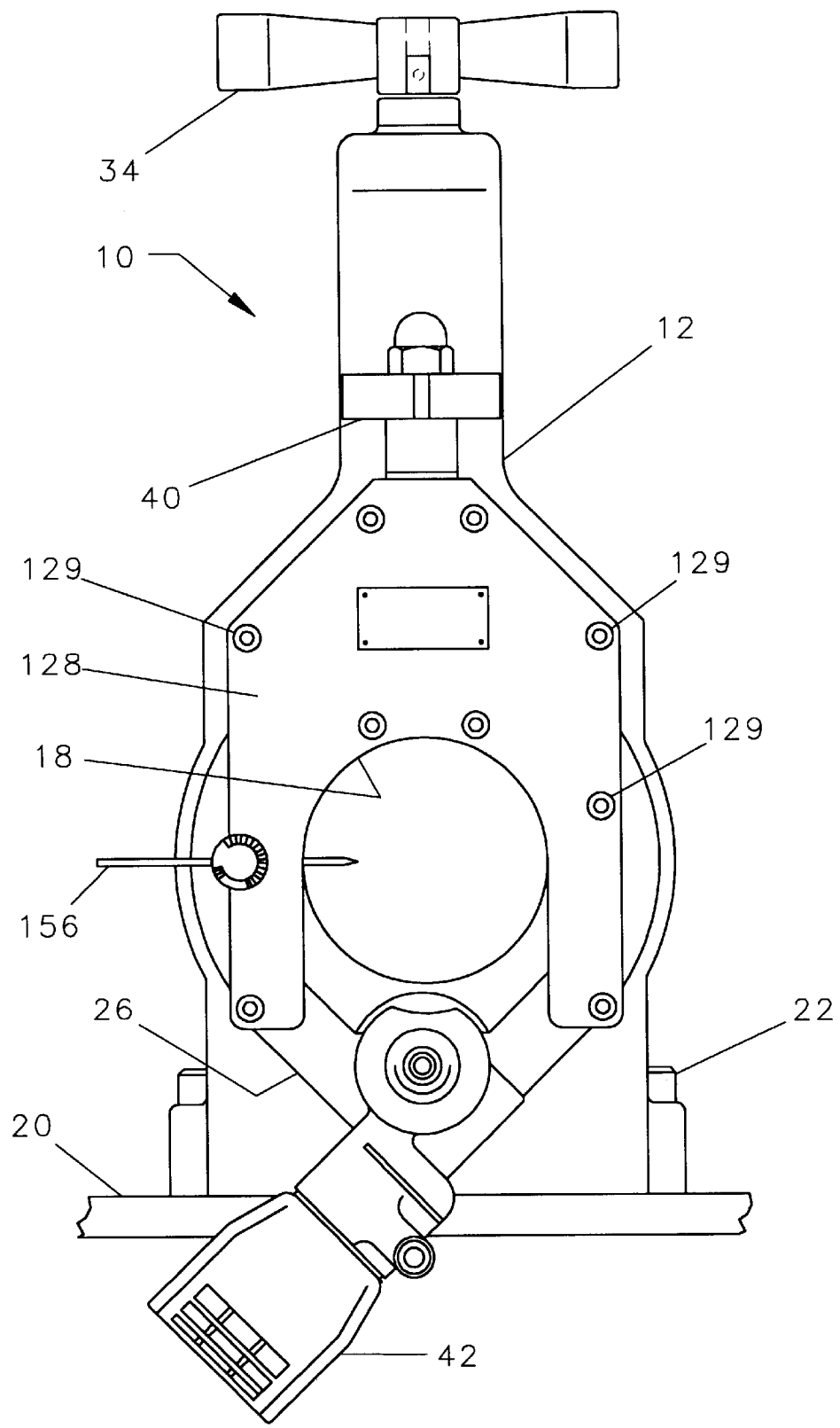
FIG. 1 is a front elevational view of a tube saw in accordance with the present invention with portions thereof shown in phantom lines.
Figure 2:
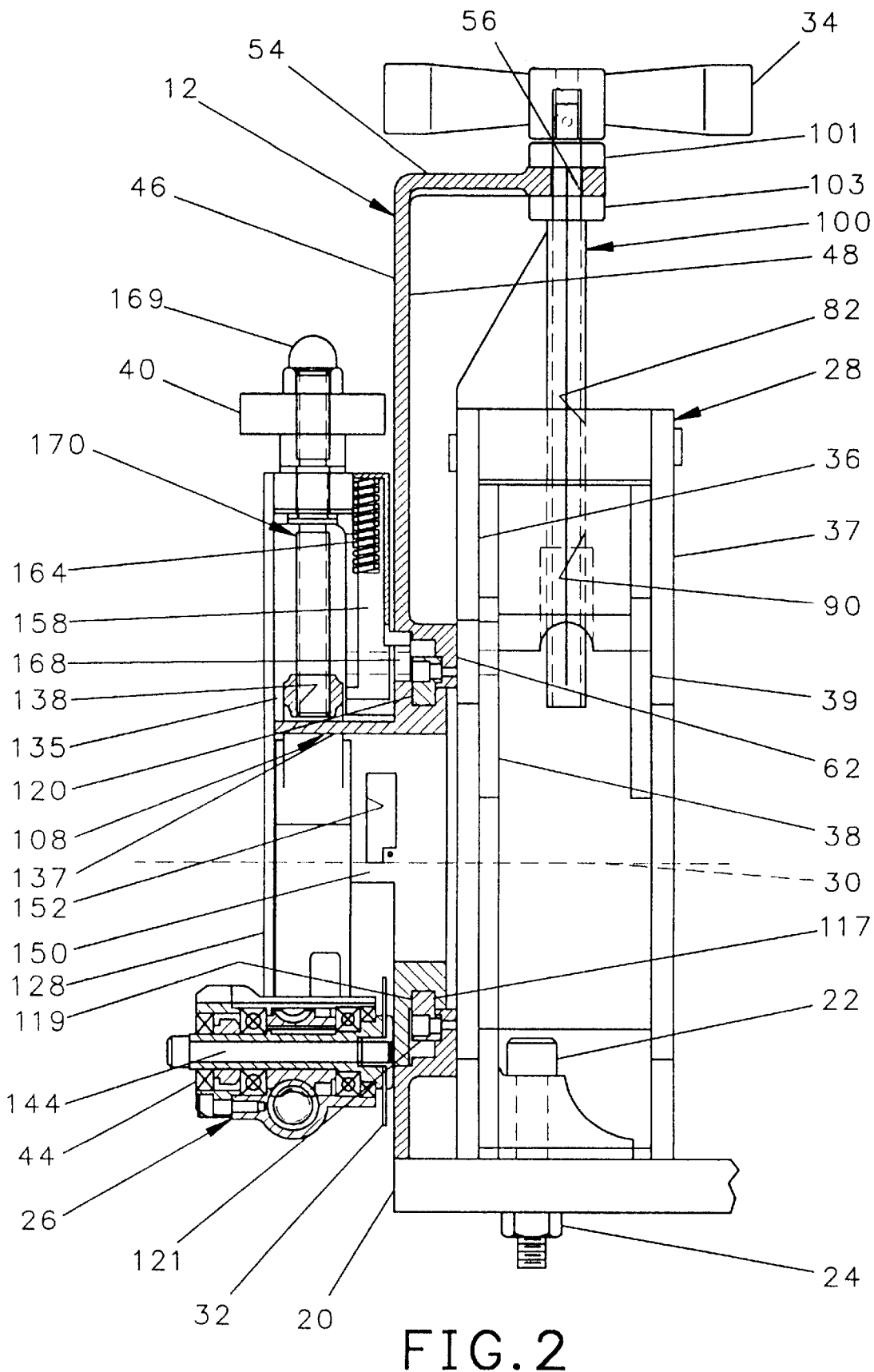
FIG. 2 is a cross sectional view of the tube saw shown in FIG. 1 taken through lines 2—2 thereof.

Referring to FIGS. 1 and 2, a tube saw 10 has a generally vertically oriented housing 12 and extending transversely therethrough is a circular aperture 18. The housing 12 has a generally planar lower surface for mounting on a generally planar bench 20 and is retained thereon by a plurality of bolts 22 extending through holes in the housing 12 and into the associated nuts 24.

Mounted to the forward side of the housing is a pivotable cutter element 26 with a cutter blade 32 and mounted to the rear side of the housing is a vise 28 for retaining the cylindrical workpiece thereon. A workpiece retained by the vise 28 will extend through the aperture 18 and its axis will be aligned with the central axis 30 of the machine where it can be cut by the rotating blade 32 on the cutter element 26. By rotating the cutter element 26 about the central axis 30, the blade 32 will engage the circumference of a tubular workpiece retained by the vise 28 and thereby cut the workpiece transverse to its length.

When a workpiece is inserted into the tube saw 10, it is clamped in position by rotating a crank 34 to move the outer jaws 36, 37 thereof upward and inner jaws 38, 39 thereof downward until the workpiece is locked between them. Thereafter, rotation of an adjusting knob 40 on the cutter element 26 draws a cutter blade 32 against the workpiece. The operator would next turn on an electric motor 42 which rotates the blade 32 through a worm drive 44. Using the distal end of the motor 42 as a lever arm, the operator can rotate the cutter element 26 around the workpiece retained in the vise 28. As the cutter element 26 is rotated, a cam, as further described below, moves the blade 32 into the workpiece, cutting its surface, and the workpiece is entirely severed when the cutter element 26 has been rotated through 360 degrees.

The worm drive 44 rotates a shaft 45 and each end of the shaft 45 has means KP to retain a complementary KP retaining nut 47, 49 thereon for retaining a blade 32. The blade 32 is depicted in solid lines as mounted on the inner end of shaft 45, that is, the end nearest the vise 28, but it may alternately be mounted on the outer end of the shaft 45 as shown in broken lines. The blade is more visible when mounted on the outer end of the shaft 45, and when practical, an operator will mount the blade on the outer end thereof. Smaller diameter workpieces are flexible, however, and to minimize the bending of smaller workpieces which are being cut by the blade 32, it will be desirable to mount the blade 32 on the inner end of the shaft 45.

Although the cutter element is rotatable around the axis 30 of the machine, when it is not in use the parts are normally oriented as shown in FIGS. 1 and 2. For the purposes of this description, the parts will be described with respect to their orientation as depicted in FIGS. 1 and 2 and, therefore, the blade 32 is at the lower end of the cutter element 26 and the knob 40 is at the top thereof.

Figure 5:
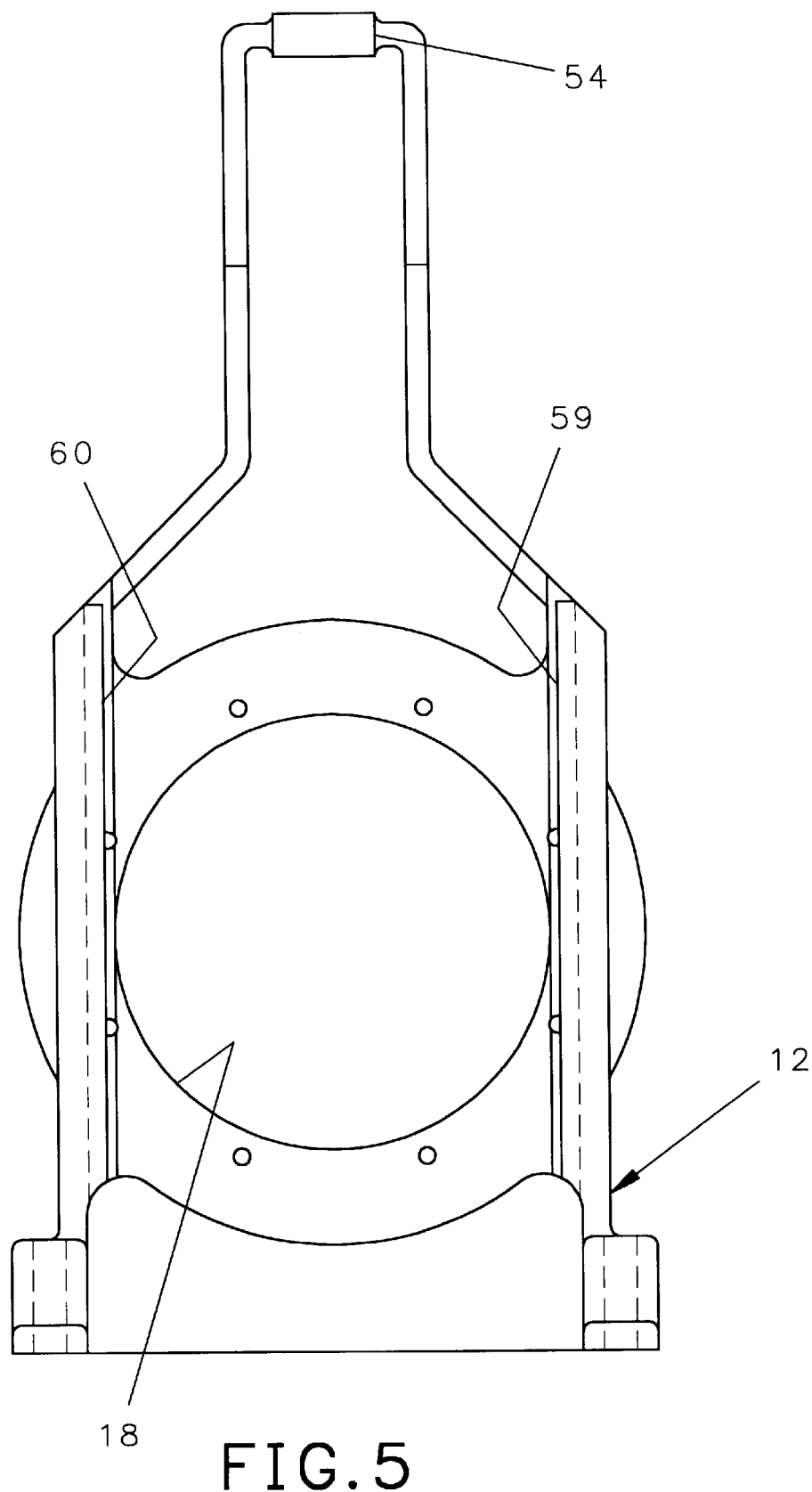
FIG. 5 is a rear elevational view of the housing shown in FIG. 3.

Referring to FIGS. 3, 4 and 5, the housing 12 has a generally vertically oriented body having a first forward side 46 against which the cutter element 26 is mounted, and a rear second side 48 against which the vise 28 is mounted. The cutter element 26 is retained by bolts, described below, threaded into a plurality of threaded mounting holes 52 in an annular machined mounting surface 50 which are spaced around the central aperture 18. At the upper end of the housing is a support arm 54 which extends rearward of the vertical body and extending vertically through the distal end of the support arm 54 is a transverse hole 56.

As best seen in FIGS. 4 and 5, on opposite sides of the second side 48 of the housing 12 are a pair of parallel tracks, one of which, 58, is shown in FIG. 4. Each of the tracks 58 has a machined first surface 57 which is a portion of the second side 48 of the housing, and an outer side surface 61. Outward of the first surfaces 57, the tracks have inwardly extending lips 59, 60, the inner second surfaces of which are machined, one such surface 62 being shown in FIG. 4.

To insure that a workpiece held in the vise 28 is retained perpendicular to the cut made by the blade 32, the surfaces 57 and 62 must be machined parallel to the mounting surface 50 of the pivot member 26.

Figures 6, 7:
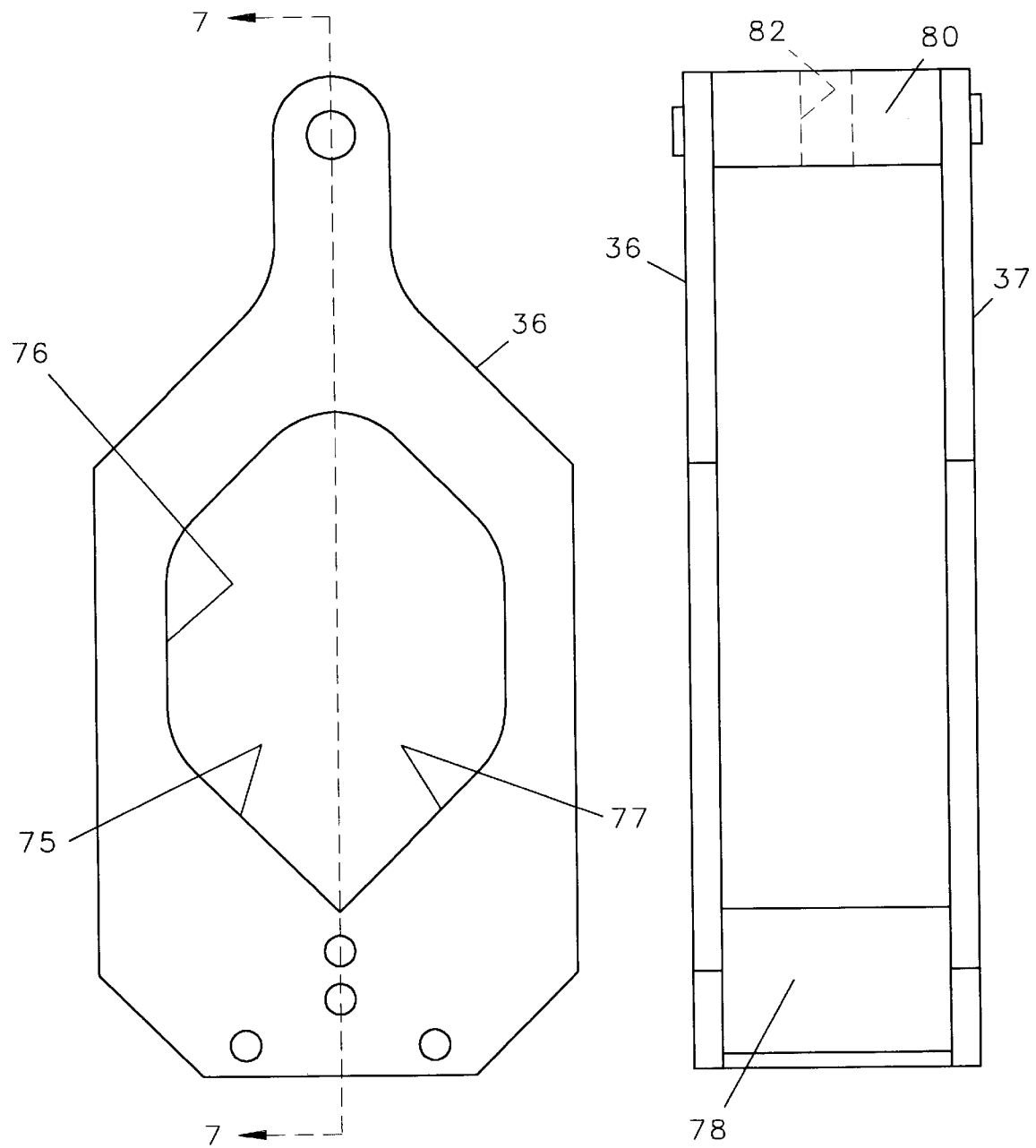
FIG. 6 is a front elevational view of the outer jaws of the tube saw shown in FIG. 1.
FIG. 7 is a cross-sectional view of the outer jaws shown in FIG. 6 taken through lines 7—7 thereof with a transverse hole in the upper end shown in phantom lines.

Referring to FIGS. 2, 6, 7, 8, 9 and 10, the vise 28 includes a pair of outer jaws 36, 37 and inner jaws 38, 39. As best shown in FIG. 6, each of the outer jaws 36, 37 has a large central opening 76, and the lower surfaces 75, 77 of the central opening 76 converge toward each other in a V-shaped configuration. As best shown in FIG. 7, the outer jaws 36, 37 are spaced parallel from each other by a lower spacer 78, and an upper spacer 80, and extending vertically through the upper spacer 80 is a threaded transverse hole 82.

Figure 8:
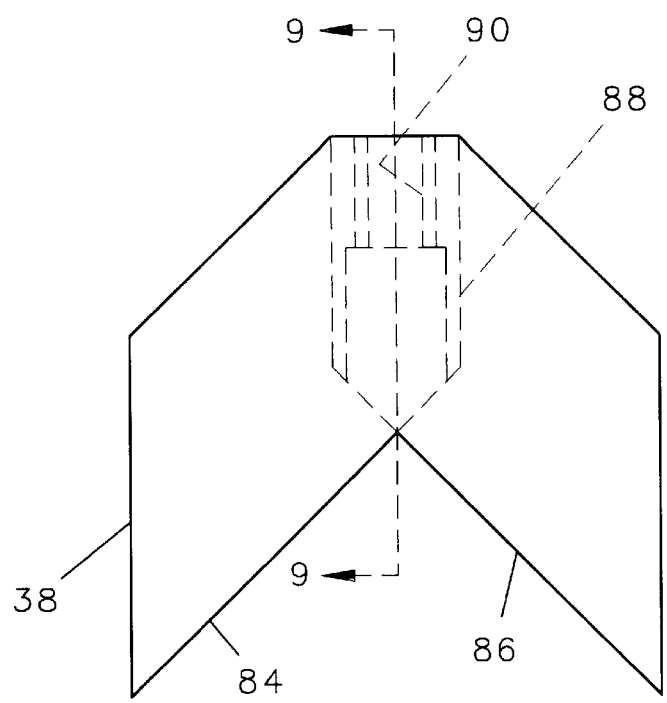
FIG. 8 is a front elevational view of the inner jaw for the tube saw shown in FIG. 1 with the inner portions shown in phantom lines.
Figure 9:
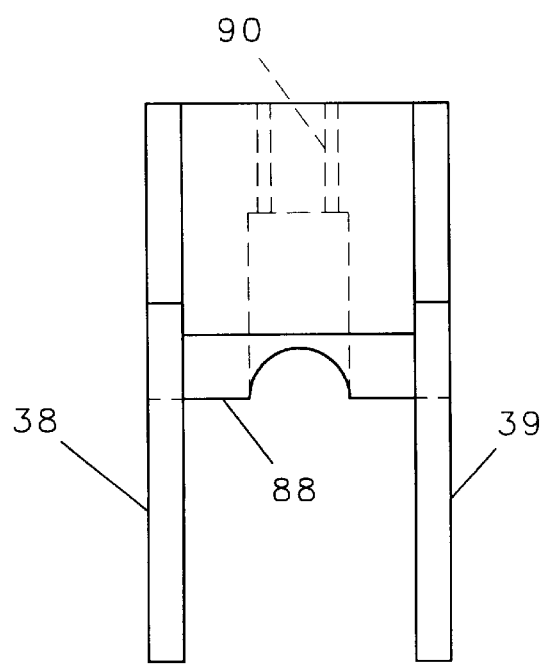
FIG. 9 is a cross sectional view of the inner jaw taken through line 9—9 of FIG. 8 with the inner portions thereof shown in phantom lines.

As best shown in FIGS. 8 and 9, the lower ends of the inner jaws 38, 39 have upwardly converging surfaces 84, 86 oriented in an inverted V configuration and the inner jaws 38, 39 are spaced from each other by a spacer 88. Extending vertically through the spacer 88 is a threaded hole 90, the threadings of which run opposite to the threadings of the transverse hole 82 in the upper spacer 80 of the outer jaws. The outer surfaces of the assembled inner jaws are parallel and are spaced a distance which is a little less than the spacing between the parallel inner surfaces 96, 98 of the assembled outer jaws 36, 37. Accordingly, the inner jaws 38, 39 are slidably movable within the outer jaws 36, 37.

Figure 10:
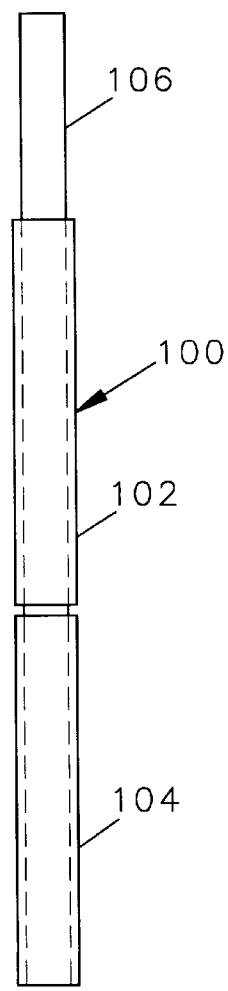
FIG. 10 is an enlarged front elevational view of the screw used to move the vise jaws of the tube saw shown in FIG. 1.
Figure 11:
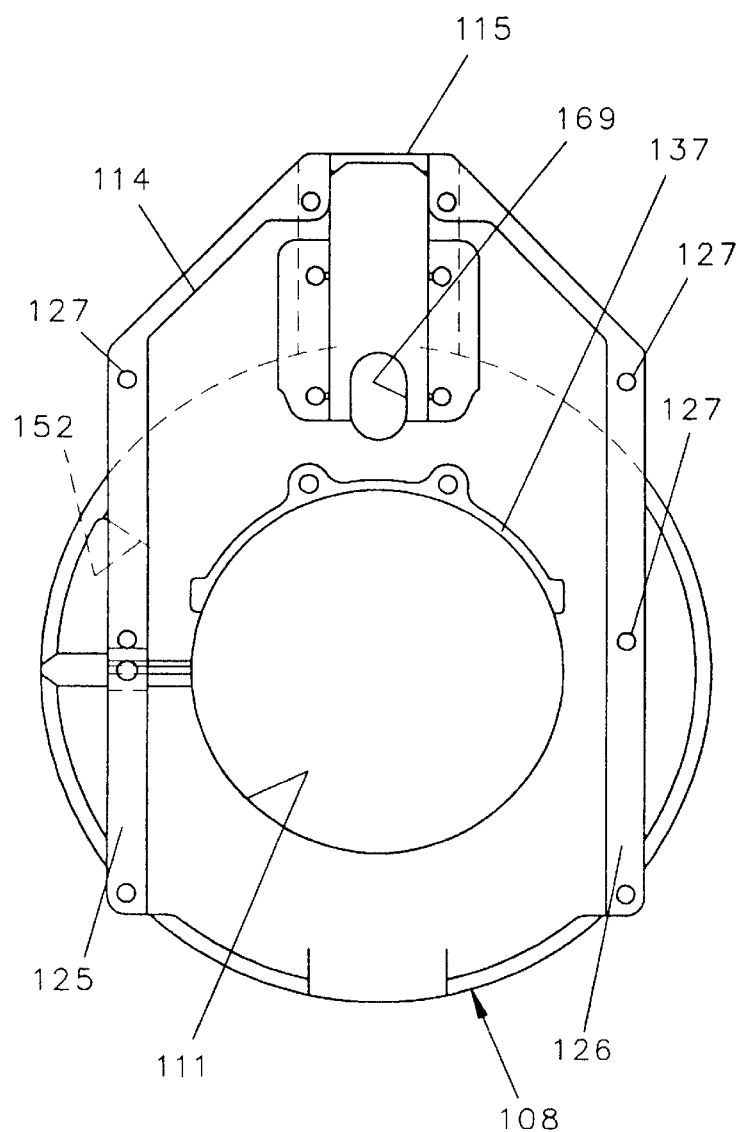
FIG. 11 is a front elevational view of the pivot member for retaining the cutter of the tube saw shown in FIG. 1.

Referring to FIGS. 2 and 10, extending through the threaded transverse holes 82, 90 and through the transverse hole 56 in a support arm 54 of the housing 12 is a screw 100. The screw 100 has a first threaded portion 102, with threads complementary to the threads of the threaded hole 82 and below the first threaded portion 102 is a second threaded portion 104 with threads complementary to the threaded hole 90. Above the first threaded portion 102 is an elongate neck 106 which extends through the transverse hole 56 of the housing 12 and through spacers 101, 103 and is retained therein by the crank 34 fastened to the upper end thereof. Therefore, rotation of the crank 34 in one direction will cause the outer jaws 36, 37 and the inner jaws 38, 39 to move towards each other, and rotation of the crank 34 in the opposite direction will cause the outer jaws 36, 37 and the inner jaws 38, 39 to move away from each other. Since the outer surfaces of the outer jaws 36, 37 are parallel to each other, and the surfaces of jaw 36 are machined and sized to slide within the tracks 58 of the housing, a workpiece retained in the jaws 36, 37, 38, 39 will be oriented perpendicular to the plane of the machined surfaces 50, 62.

Referring to FIGS. 2, 11, 12 and 13, the cutter element 26 includes a pivot member 108 and a cutter housing described below. The pivot member 108 has a central opening 111 surrounded by an annular retaining portion 110 having an annular groove 112 in the outer circumference thereof. Upward and forward of the retaining portion 110 is an adjusting housing 114 for retaining an adjusting screw as further described below. The upper wall of the adjusting housing 114 has an opening 115 in which an adjusting screw and cam follower are retained.

Figure 12:
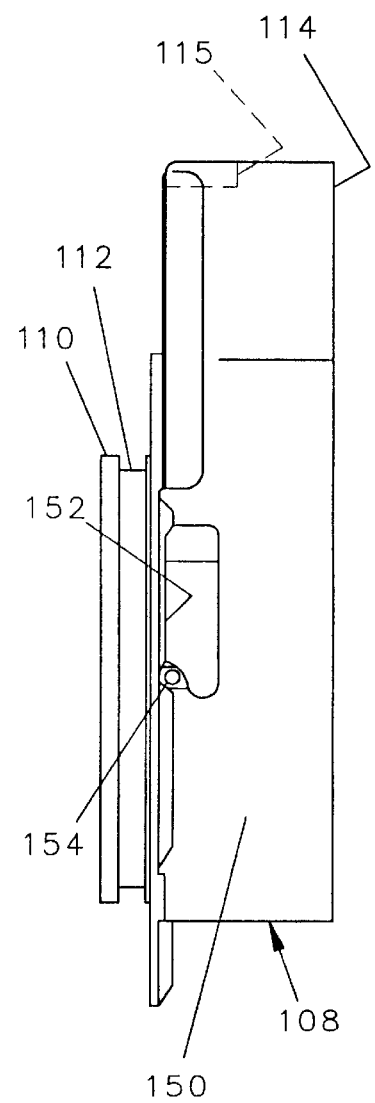
FIG. 12 is a side elevational view of the pivot member shown in FIG. 11 with a cutout portion at the upper end thereof shown in broken lines.
Figure 13:
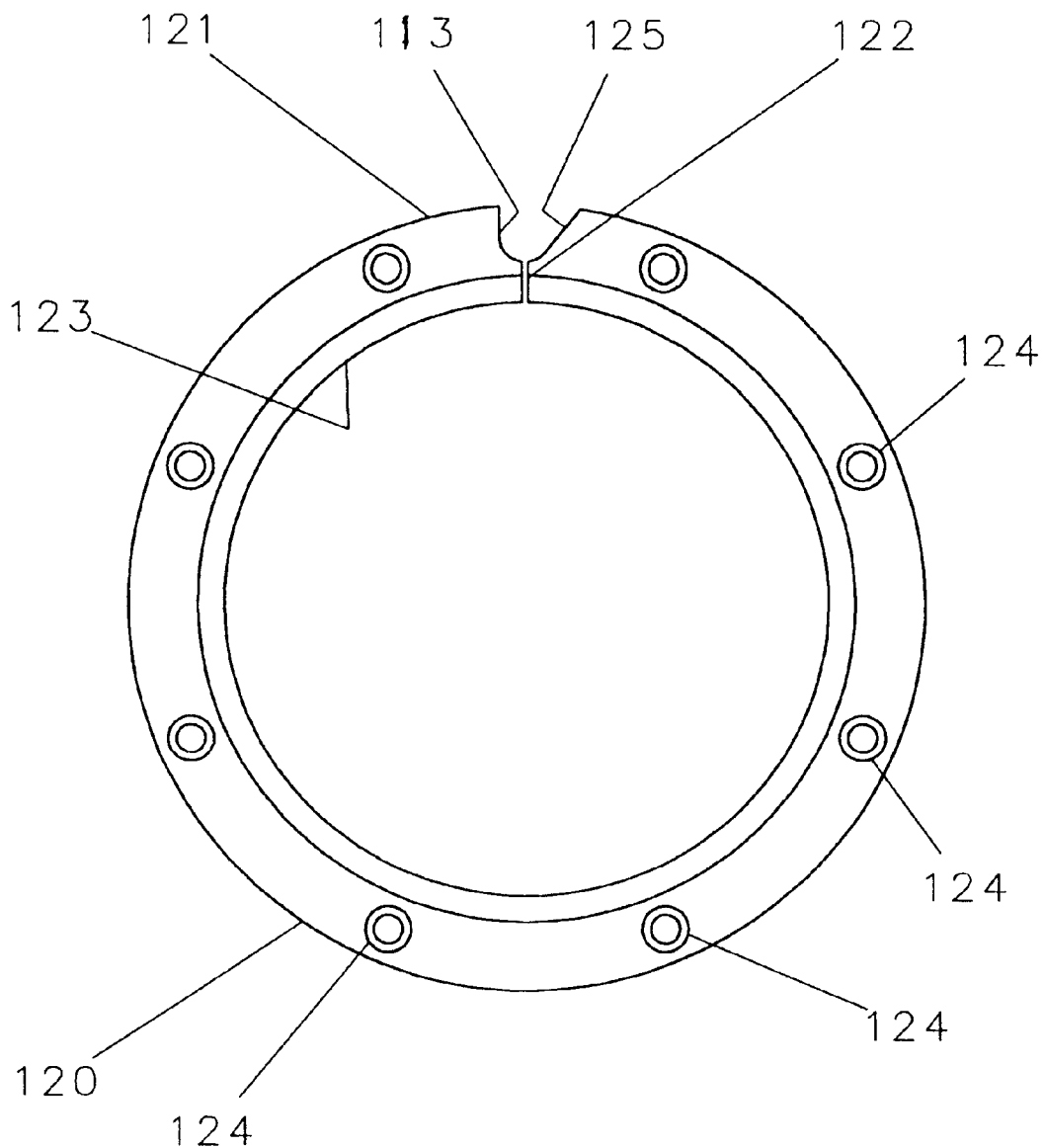
FIG. 13 is a front elevational view of a cam member for retaining the pivot member of FIG. 11 to the housing of FIG. 3.
Figure 14:
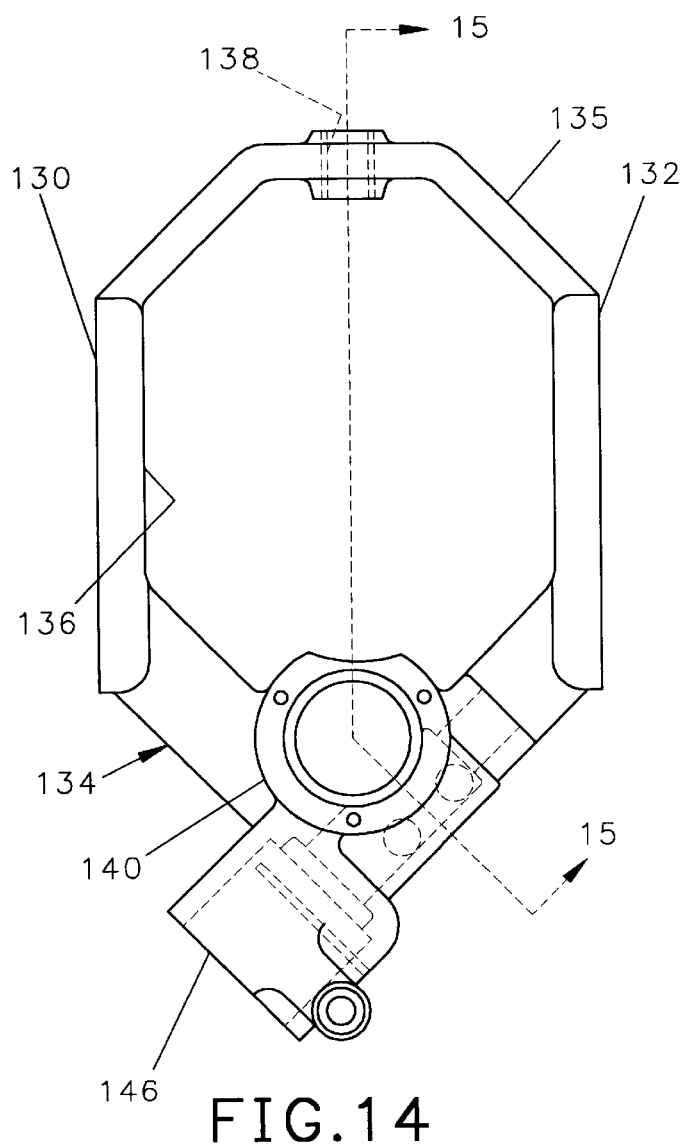
FIG. 14 is a front elevational view of the cutter drive housing for retaining the cutter of the tube saw shown in FIG. 1.
Figure 15:
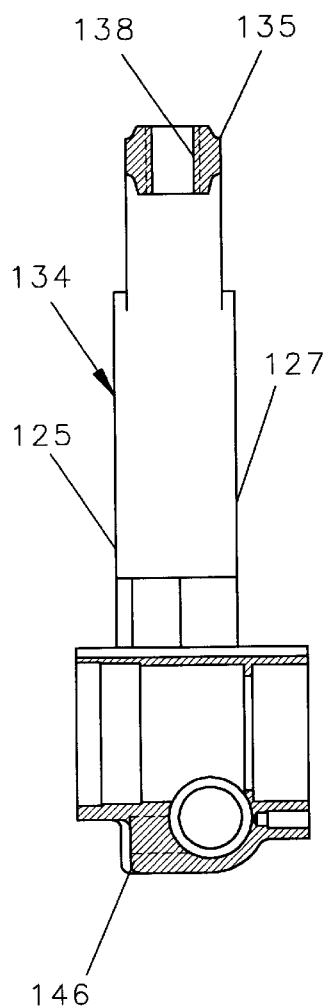
FIG. 15 is a cross-sectional view of the cutter housing taken through line 15—15 of FIG. 14.
Figure 16:
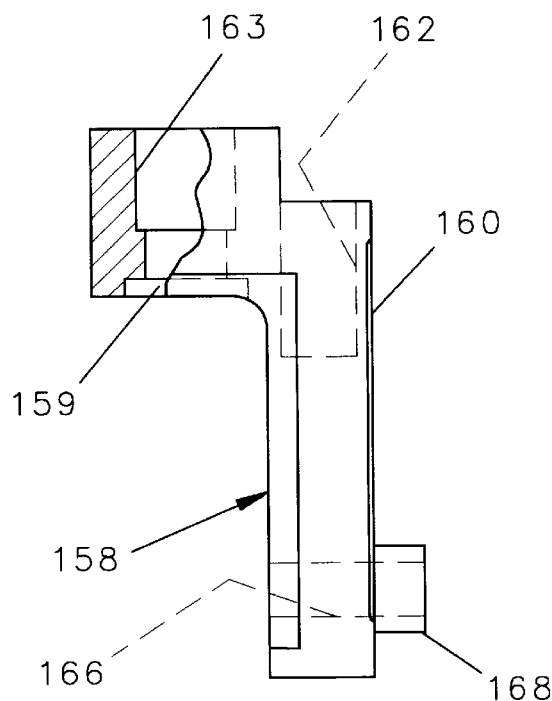
FIG. 16 is an enlarged side view of a cam follower in the tube saw of FIG. 1 which is shown partially in cross-section with the inner portions shown in broken lines.
Figure 17:
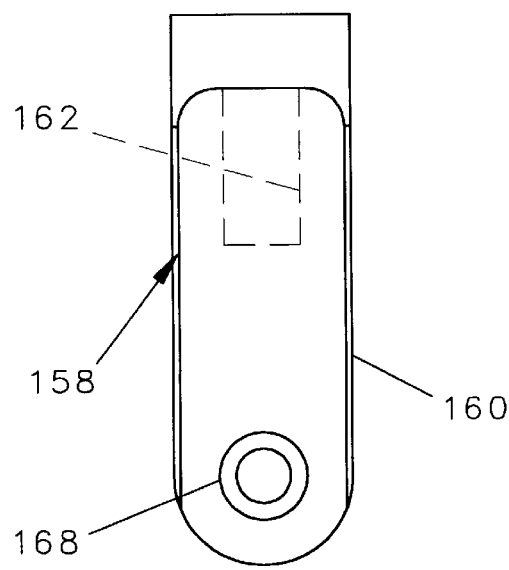
FIG. 17 is an end view of the cam follower shown in FIG. 16.
Figure 18:
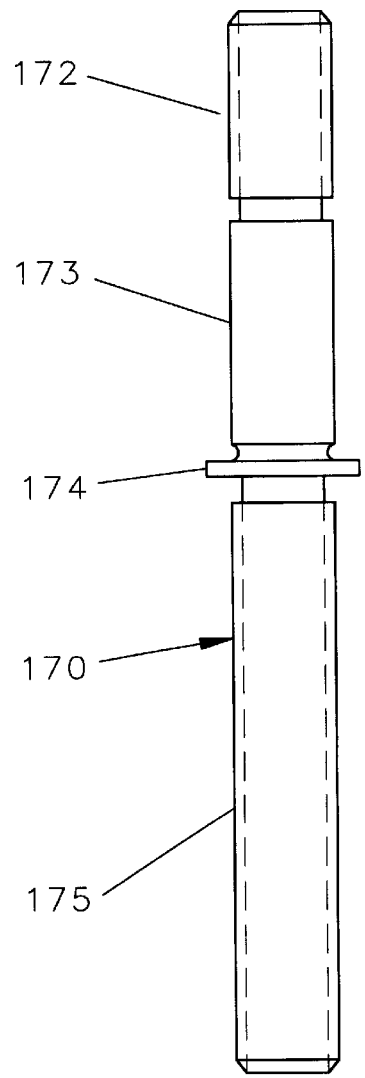
FIG. 18 is an enlarged side elevational view of the cutter adjusting shaft for the tube saw shown in FIG. 1.

As best shown in FIGS. 1, 2, 12, and 13, the rotating member 108 is retained to the housing 12 by a retaining ring 120, the rearward surface 117, the forward surface 119, the cylindrical outer surface 121, and the cylindrical inner bore 123 of which are all machined. As can be seen, the retaining ring 120 has a transverse cut 122 at the upper end thereof such that the ring can be opened to fit the inner bore 123 around the annular retaining portion 110 and into the groove 112. Also, the outer surface of the ring 120 has indentations 113, 125 on opposite sides of the cut 122 forming a notch for receiving a cam follower where the outer surface 121 of the retaining ring 120 is a cam. As shown in FIG. 13, the retaining ring 120 has a plurality of spaced countersunk transverse holes 124 which can be aligned with the threaded mounting holes 52 of the forward surface of the housing 12. Referring to FIG. 2, 3, 10, 12 and 13 when the retaining ring 120 is fitted in the annular groove 112, and is attached by bolts, not shown, extending through holes 124 and threaded into holes 52 in the housing 12, the rotating member 108 can be slidably rotated about the longitudinal axis 30 of the housing.

Referring to FIGS. 1, 2, 11, 14 and 15, the pivot member 108 has parallel guide walls 125, 126 and extending into the outer ends of the guide walls 125, 126 are a plurality of threaded holes 127. The inner surfaces of the guide walls 125, 126 define a track which slidably retains the parallel side members 130, 132 of a cutter housing 134. The body of the cutter housing 134 defines a closed loop which extends around a central opening 136 having inner dimensions large enough to receive the end of a workpiece to be cut by the tube saw 10. The upper end 135 of the housing 134 extends around an arcuate wall 137 adjacent the upper edge of the central opening 111 of the pivot member 108. The cutter housing 134 and the adjusting screw assembly in the adjusting housing 114 are retained within the pivot member 108 by a cover plate 128 having a plurality of mounting holes positioned to align over the threaded holes 127 such that the cover plate is retained by a plurality of bolts 129 extending into the threaded holes 127.

Through the upper end 135 of the cutter housing 134 is a vertically oriented threaded transverse hole 138, and at the lower end of the cutter housing is an enclosure 140 in which is fitted the worm drive 44. An output shaft 45 KP from the worm drive 44 extends perpendicular to the planar forward surface 46 and planar rearward surface 48. Attached to the distal end of the shaft 45 KP is the cutter blade 32. At the lowermost end of the cutter housing 134 is a clamp 146, and retained within the clamp 146 is the end of the motor 42. As can be seen, the output shaft of the motor 42 is drivingly connected to the input shaft of the worm drive 44 to provide rotational energy to the cutter blade 32.

As best shown in FIGS. 2 and 12, extending through a wall 150 of pivot member 108 is an aperture or window 152. Adjacent the window 152 is a transverse hole 154 sized to slidably receive an elongate cylindrical indicator pin 156. The hole 154 is positioned to direct the point of an indicator pin 156 inserted therein in a plane defined by the outer circumference of the blade 32 and radially towards the surface of a workpiece retained in the vise of the tube saw 10.

Referring to FIGS. 2, 11, 12, 14, 15, 16, and 17, within the adjusting housing 114 of the pivot member 108 is a cam follower 158 having a horizontal leg 159 and a vertical leg 160 into which parallel vertical bores 162 and 163 extend from the upper end thereof for receiving a coil spring 164 and a shaft 170 for radially adjusting the cutter blade 32 and drive 44, respectively. At the lower end of the vertical leg 160 is a horizontally oriented transverse hole 166 for receiving a follower pin 168. When positioned in the adjusting housing 114, the follower pin 168 extends through an oval aperture 169 in the pivot member 108 such that the distal end thereof will move along the outer surface 121 of the retaining ring 120 when the cutter element 26 and the associated pivot member 108 are rotated about the axis 30 of the machine.

As shown in FIG. 2, the follower pin 168 is positioned to move along the outer cam surface 121 of the retaining ring 120, and when the rotating member 108 is vertically oriented, as shown in FIGS. 1 and 2, the follower pin 168 will rest within the notch formed by indentations 113, 125.

Referring to FIGS. 2, 16, 17 and 18, the shaft 170, which extends through the vertical hole 163 in the cam follower 158 has a threaded upper end 172 for receiving the adjusting knob 40 which is non-rotating secured to the shaft 170 by any appropriate means such as a jam nut 169. Below the threaded upper end 172 is a cylindrical midsection 173 which has a diameter sized to slidably fit through the vertical hole 163 of the cam follower 158. Below the midsection 173 is an annular flange 174 the upper surface of which abuts against the lower surface of the horizontal leg 159 of the cam follower 158. Below the flange 174 is a threaded lower end 175 which is threadedly engaged into the threaded hole 138 in the upper end 135 of the cutter housing 134. As best shown in FIG. 2, the coil spring 164 urges the cam follower 158 and the cutter housing 134 downward, thereby urging the blade 32 radially outward of the central axis 30. Rotation of the knob 40 in one direction will move the cutter housing 134 and cutter blade 32 radially inward and rotation of the knob 40 in the opposite direction will move the blade 32 outward.

The rotation of the pivot member 108 around the retaining ring 120 will cause the cam follower 158 to move upward as the follower pin 168 moves out of the notch, and along the outer surface 121 thereof, and the upward movement of the cam follower 158 causes the blade 32 to move radially inward toward the axis 30 of the machine.

To operate the tube cutter 10, the housing 12 is attached to a suitable bench 20 and retained in place by the bolts 22 and nuts 24. The crank 34 is turned to open the vise 28 by moving the outer jaws 36, 37 and the inner jaws 38, 39 away from one another. The knob 40 is also rotated to move the cutter blade 32 radially outward of the central axis 30 of the machine a distance sufficient to allow a workpiece to be inserted into the vise.

To cut a desired length of tubing, the tubing is first measured and the outer surface marked where it is to be cut. Thereafter, the tubing is inserted through the aperture 18 and the crank 34 turned until the inner and outer jaws of the vise 28 are against the outer surface of the workpiece therein. The indicator pin 156 is inserted through the hole 154 until its distal end makes contact with the outer surface of the workpiece and the position of the workpiece is adjusted until the distal end of the indicator pin 156 lies immediately over the marker line. The operator can observe the positioning of the workpiece with respect to the indicator pin 156 through the window 152. Once the piece is properly aligned, the crank 34 is again rotated to lock the workpiece in the vise 28.

Thereafter, the knob 40 is rotated to draw the cutter housing 134 and cutter blade 32 radially inward toward the outer surface of the workpiece. After the outer edge of the cutter blade 32 contacts the surface of the workpiece, the motor 42 can be turned on. The motor will drive through the worm drive 44 to rotate the blade 32. The operator can then grasp the motor housing and use it as a lever to rotate the cutter element 26 around the axis 30 of the machine. As the operator rotates the cutter element 26, the cam follower 158 will be moved radially outward to the outer surface of the retaining ring 120 thereby causing the cutter housing 134 to be moved radially inward an equal distance and forcing the blade 32 into the surface of the workpiece. When the operator has rotated the cutter element 26 through 360 degrees, the cam follower 158 will again drop within the notch of the retaining ring 120 and the cutter blade 32 will have completed a 360 degree cut around the workpiece thereby completing the cut.

It should be appreciated that since the first and second surfaces 46, 48 are machined parallel to one another, that these surfaces retain the vise 28 on one side thereof, and the cutter element 26 on the other side thereof in parallel relationship thereby ensuring that a cut by the blade 32 in a workpiece retained in the vise 28 will be perpendicular to the axis of the workpiece.

While one embodiment of the present invention has been shown and described, it will be apparent to those skilled in the art that many changes and modifications may be made without departing from the true spirit and scope of the present invention. It is the intent of the appended claims to cover all such changes and modifications which fall within the true spirit and scope of the invention.

What is claimed:

1. A tube saw comprising,
   a housing having a first side, a second side and a central opening through said first side and said second side,
   a first surface on said first side of said housing and a second surface on said second side of said housing, said first surface and said second surface being parallel to each other,
   vise means for retaining a cylindrical workpiece perpendicular to said parallel surfaces and extending through said central opening,
   said vise means including a slidable jaw,
   first track means and second track means on said second side of said housing for slidably retaining said slidable jaw of said vise means between said first track means and said second track means,
   said first track means and said second track means extending parallel to each other and said central opening positioned between said first track means and said second track means,
   said slidable jaw movable along said second surface,
   pivot means on said first surface, said pivot means for pivoting about a cylindrical workpiece retained in said tube saw, and
   a blade retained by said pivot means.

2. A tube saw in accordance with claim 1 and further comprising,
   a cam on one of said housing and said pivot means,
   a follower on the other of said housing and said pivot means,
   whereby engagement of said follower with said cam moves said blade radially inward relative to a central longitudinal axis of said tube saw.

3. A tube saw in accordance with claim 1 and further comprising,
   adjustment means for radially adjusting said blade relative to a central longitudinal axis of said tube saw.

4. A tube saw in accordance with claim 1 and further comprising,
   an indicator means on one of said housing and said pivot means,
   said indicator means movable toward and away from a surface of said workpiece retained in said vise, and
   said indicator means movable in a plane defined by the cut of said blade around said workpiece retained in said vise for indicating the cut line of said blade.

5. A tube saw in accordance with claim 4 and further comprising,
   a window in one of said housing and said pivot means for viewing a distal end of said indicator means when said distal end is positioned against said workpiece.

6. A machine comprising,
   a housing, having a forward surface and a central opening in said forward surface,
   a vise for retaining an elongate workpiece having an axis with said axis of said workpiece perpendicular to said forward surface and through said central opening,
   a rotatable member rotatable on said housing, said rotatable member rotatable about said axis of a said workpiece while said workpiece is retained in said vice,
   tool retaining means on said rotatable member for retaining a tool for working against said workpiece held in said vise,
   said tool retaining means locked against axial movement with respect to said workpiece retained in said vice,
   a tool in said tool retaining means,
   an indicator means movable toward and away from said workpiece held in said vise,
   said indicator means axially aligned with said tool retaining means for indicating said plane in which said tool will engage said workpiece held in said vise.

7. A machine in accordance with claim 6 and wherein one of said housing and said retaining means has a hole therein, and
   said indicator means slidable through said hole.

8. The machine in accordance with claim 6 wherein said tool is a saw blade.

9. The machine in accordance with claim 6 wherein said indicator means is retained on one of said housing and said tool retaining means.

10. The machine in accordance with claim 9 and further comprising,
    said one of said housing and said tool retaining means having a window therein, said window positioned near said indicator means to permit operator inspection of the position of said indicator means with respect to a marker line on said workpiece held in said vise.

11. A tube saw comprising,
    a housing,
    a vise for retaining a cylindrical workpiece having a longitudinal axis, pivot means on said housing for pivoting around the longitudinal axis of said workpiece held in said vise, a rotatable shaft on said pivot means, said rotatable shaft having a first end and a second end, and said shaft having a longitudinal axis parallel to said axis of said workpiece held in said vise, drive means for rotating said rotatable shaft, and first attachment means at said first end and second attachment means at said second end of said shaft, said first attachment means and second attachment means for attaching a rotatable cutting blade whereby said cutting blade can be removably attached to said first end and to said second end of said shaft.

12. A tube saw in accordance with claim 11 and further comprising, said housing having a first side, a second side and a central opening through said first side and said second side, a first surface on said first side of said housing and a second surface on said second side of said housing, said first surface and said second surface being parallel to each other, said pivot means mounted on said first surface, said vise including a slidable jaw, and slide means on said second surface of said housing for slidably retaining said slidable jaw of said vise.

13. A tube saw in accordance with claim 12 and further comprising, adjustment means for radially adjusting said rotatable shaft relative to a central longitudinal axis of said tube saw.

14. A tube saw in accordance with claim 13 and further comprising, an indicator means on one of said housing and said pivot means, said indicator means movable toward and away from a surface of said workpiece retained in said vise, and said indicator means movable in a plane defined by the cut of said cutting blade on said shaft around said workpiece retained in said vise for indicating the cut line of said cutting blade.

15. A tube saw in accordance with claim 14 and further comprising, a window in one of said housing and said pivot means for viewing a distal end of said indicator means when said distal end is positioned against said workpiece.

* * * * *

UNITED STATES PATENT AND TRADEMARK OFFICE
CERTIFICATE OF CORRECTION

PATENT NO. : 5,933,963
DATED : August 10, 1999
INVENTOR(S) : Kenneth R. Pierce

It is certified that error appears in the above-indentified patent and that said Letters Patent is hereby corrected as shown below:

In column 3, line 52, after "means" delete "KP" and after "complementary" delete "KP."

In column 5, line 56, after "shaft 45" delete "KP."

In column 5, line 59, after "shaft 45" delete "KP."

In column 8, line 51, after "said indicator means," insert --is--.

Signed and Sealed this

Eleventh Day of April, 2000

Attest:

Attesting Officer

Q. TODD DICKINSON

Director of Patents and Trademarks